No. 729,027. PATENTED MAY 26, 1903.
W. G. WILSON.
VALVE.
APPLICATION FILED JUNE 23, 1902.
NO MODEL.

Witnesses:

M. E. Beall.

Inventor.
Walter Gordon Wilson
by
Atty.

No. 729,027. Patented May 26, 1903.

UNITED STATES PATENT OFFICE.

WALTER GORDON WILSON, OF WESTMINSTER, ENGLAND.

VALVE.

SPECIFICATION forming part of Letters Patent No. 729,027, dated May 26, 1903.

Application filed June 23, 1902. Serial No. 112,917. (No model.)

*To all whom it may concern:*

Be it known that I, WALTER GORDON WILSON, engineer, a subject of the King of Great Britain, residing in the city of Westminster, in the county of Middlesex, England, have invented new and useful Improvements in Valves, of which the following is a specification.

This invention relates to valves, and it is especially applicable to induction-valves for vapor or explosion engines such as are used for motor-cars and other purposes. Hitherto it has been usual to make the valve-spindle plain and to keep the valve in place normally against its seat by means of a spring around the said spindle, which spring was held in compression by means of a collar having a flange with an annular groove therein for the reception of the spring, such collar being attached to the valve-spindle by a cotter going through a slot in the said collar and through the spindle itself. Such a construction, however, weakened the spindle very considerably, owing to the comparatively large diameter of the hole, all the strain being thrown on the one place where the hole was by the cotter, and the result was that the spindles very often snapped at the hole.

Now according to this invention the spindle is screwed for some distance from its end and instead of a collar a comparatively long nut is used, while the latter is prevented from turning by means of a pin going through holes in the nut and the spindle at some distance from the commencement of the screw-thread, so that most or the whole strain or jar is thrown on the screw-thread of the spindle and little or none on the pin, which latter is normally prevented from coming out by reason of the helical spring surrounding part of the nut and the valve-spindle.

Figure 1:
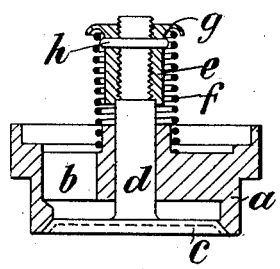
Figure 2:
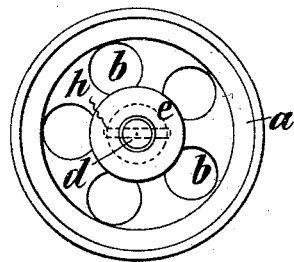

Figure 1 of the accompanying drawings represents in sectional elevation a valve-casing provided with a valve constructed according to this invention, and Fig. 2 is a plan thereof.

The valve-casing $a$ is made, as shown, with openings $b$ in the usual manner for the passage of the vapor or fluid. The valve $c$ has a spindle $d$ screwed for some distance from its end and plain the rest of the way to act as a guide in the usual manner. The screwed part of the spindle is provided with the long nut $e$, and the valve is kept in place normally against its seat by means of a helical spring $f$, surrounding the said nut and held in compression against the valve-casing by means of a flange on the nut having an annular groove or recess $g$ for receiving the spring. The nut is prevented from turning by means of a loose hardened pin $h$ going through holes in the nut and spindle at some distance from the commencement of the screw-thread and preferably nearer the end of the screw than the commencement of the thread, so as to allow as much screwed surface as possible for the purpose of holding the nut and spindle together where the spindle is not weakened by the hole made through same.

What I claim as my invention, and desire to secure by Letters Patent, is—

1. A valve provided with a spindle threaded on its end and a hole through said spindle near the end of the threaded portion, a nut on the threaded portion of the spindle having holes to register with that in the spindle, a loose pin lying in the holes of nut and spindle, and a spring surrounding the spindle and bearing on the nut to keep the valve normally closed and hold the pin in position, substantially as set forth.

2. In a valve, the combination of a valve-casing, the valve-body, a spindle attached to the valve-body, a screw-thread on the spindle, a transverse hole through the spindle, a nut on the screwed part of the spindle, holes through the said nut adapted to register with the hole through the spindle, a grooved collar on the nut adapted to receive one end of a coiled spring, the said spring in compression encircling the valve-spindle and the nut and bearing at one end against the nut and at the other end against the valve-casing and a hardened pin lying freely in said holes adapted to lock the nut and the spindle together, said spring being adapted to surround the two ends of the pin to keep the latter in position substantially as set forth.

In testimony whereof I have signed my name to this specification in the presence of two subscribing witnesses.

WALTER GORDON WILSON.

Witnesses:
VICTOR JENSEN,
WALTER J. SKERTEN.